Dec. 9, 1969  YASUO NANNICHI  3,483,480
SEMICONDUCTOR COMPOUND LASERS
Filed Oct. 17, 1966
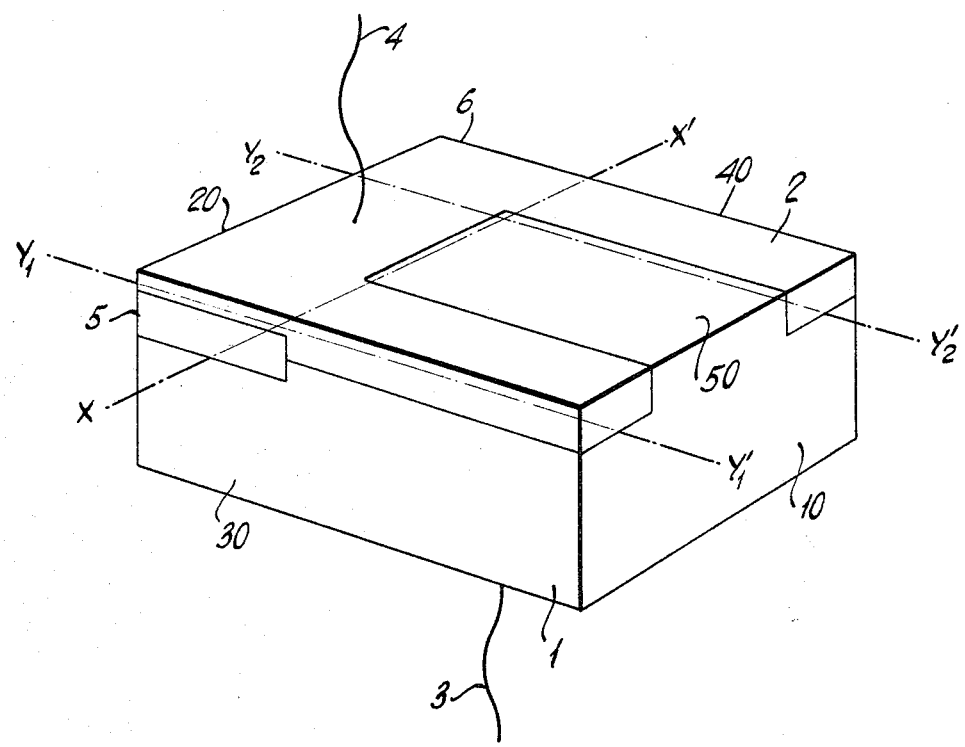
INVENTOR
YASUO NANNICHI
BY
Hopgood & Calimafde
ATTORNEYS

United States Patent Office 3,483,480
Patented Dec. 9, 1969

3,483,480
SEMICONDUCTOR COMPOUND LASERS
Yasuo Nannichi, Tokyo, Japan, assignor to Nippon Electric Company, Limited, Tokyo, Japan, a corporation of Japan
Filed Oct. 17, 1966, Ser. No. 587,181
Claims priority, application Japan, Oct. 19, 1965, 40/64,092
Int. Cl. H01s 3/02
U.S. Cl. 331—94.5
4 Claims

ABSTRACT OF THE DISCLOSURE

A compound semiconductor laser device comprising in a single block a plurality of lasers arrayed in parallel with light emission areas in a common plane, and a light amplification region oriented across the parallel axes of the lasers, containing a portion of the common plane of the active regions of the lasers. The variation in photon density along the light amplification axis in response to analogue input consecutively and cumulatively quenches individual lasers of the array producing a digital output. Conversely, variation in input along the laser emission axes in response to digital inputs causes a relative variation, or analogue, output of the light amplification region.

---

This invention relates generally to semiconductor lasers capable of performing analogue-to-digital or digital-to-analogue light conversion and more particularly to a new and improved geometrical configuration of devices named by the present inventor as "semiconductor compound lasers" intended for use as logic elements in optical computers now in the course of development in various countries.

It is an object of this invention to develop semiconductor compound lasers with a geometrical configuration adapted to perform optoelectronic action which is inherently quicker in operating speed than electromechanical or electrical action as performed by conventional analogue-to-digital (A–D) or digital-to-analogue (D–A) transducers used as the electronic computer elements.

A further object of this invention is to provide a particular geometrical configuration for an assembly of semiconductor lasers in a single block so that both space and driving power requirements are significantly reduced, light conversion efficiencies are made much higher, and manufacturing is made easier and less expensive than if the lasers were used separately as operating units in optical computers.

Yet another object of this invention is to provide a particular geometrical configuration for semiconductor compound lasers which permits grouping a suitable number of lasers in a single block, thereby making possible extremely compact design of the optical computers.

All of the objects, features and advantages of this invention and the manner of attaining them will become more apparent and the invention itself will be best understood by reference to the following description, taken in conjunction with the accompanying drawing, which illustrates the geometrical configuration of a semiconductor compound laser in schematic form as one embodiment of the invention.

A theoretical aspect of this invention is based on a physical phenomenon discovered by the present inventor, namely, that the gain coefficient $g$ of light in the active region of a semiconductor laser varies with the photon density in that region.

By way of further explanation, let the photon density due to spontaneous emission in the active region at energy level E be $P_{spon}(E)$ and that at energy level E due to stimulated emission be $P_{stim}(E)$. Then the value of the gain coefficient $g$ should be inversely proportional to the sum of the values of $P_{spon}(E)$ and $P_{stim}(E)$, (Note: This phenomenon as a theoretical background for realizing semiconductor compound lasers according to this invention is fully dealt with in a treatise by the present inventor entitled "Variation of the Gain Factor of GaAs Lasers With Photon and Current Densities" printed in the Journal of Applied Physics, 37, 3009, July 1966.)

The geometrical configuration of semiconductor compound lasers consists of two or more parallel-axis lasers, each having an active region to perform laser emission in a plane bounded by a pair of opposing parallel reflecting surfaces, two or more light amplification structures each having another active region generally intersecting said active region orthogonally and in the same plane as mentioned previously, which is also bounded by another pair of opposing anti-reflection film-deposited surfaces inclined orthogonally or at an arbitrary angle with respect to said plane so that common active regions may be produced in said plane at intersections between the former active regions and the latter active regions.

The single FIGURE of the drawing shows a perspective view of a compound laser of the invention.

The principles of this invention and the operating features of the semiconductor compound laser in accordance therewith will now be described in connection with the embodiment of this invention shown in the accompanying drawing. In the drawing there is shown a basic compound laser structure consisting of two lasers wherein the numeral 1 denotes an n-type GaAs crystal doped with tellurium (Te) to a carrier concentration of the order of $10^{18}/cm.^3$. Typical exemplary dimensions of the compound laser are 0.5 mm. along the Y–Y' axis, 0.5 mm. along the X–X' axis and 0.1 mm. in thickness.

Ths numeral 2 denotes a p-type region, approximately 20 microns in thickness, formed on the top surface of the n-type GaAs crystal by a suitable method such as the selective diffusion or epitaxial growth methods, so as to reside adjacent to the inner top surface 50, preferably in the manner illustrated. The dimensions of the inner rectangle 50 may be, for example, 0.3 mm. by 0.3 mm.

The numerals 10 and 20 denote a pair of opposing reflecting surfaces, each being orthogonal to the p-n junction plane. Numerals 30 and 40 denote another pair of opposing surfaces on which anti-reflection films 5 and 6 are deposited as illustrated. Lead wires 3 and 4 are connected, respectively, to the n and p type regions.

Analogue-to-digital light conversion performed by the compound laser according to this embodiment will now be analyzed. Upon conducting a current of approximately one ampere in the compound laser by applying a DC voltage across the terminals 3 and 4 with the terminal 3 negative and the terminal 4 positive and with the laser maintained at 77° K., laser emission at wavelengths of the order of 8,400 A. occurs simultaneously along the axes $Y_1$–$Y_1'$ and $Y_2$–$Y_2'$. With the device thus stimulated, when light at the 8400 A. wavelength is directed upon the anti-reflection film-deposited surface in the direction of the X–X' axis, light amplification takes place and the photon density gradually increases along X–X' in the direction of X'.

As a result the value of the gain coefficient in the direction of the axis $Y_1$–$Y_1'$ gradually decreases, but at a rate of decrease less than that at which the value of the gain coefficient in the direction of the axis $Y_2$–$Y_2'$ decreases.

As the intensity of the light along X–X' is increased, a first threshold current value $I_1$ is reached at which laser emission in the direction of the axis $Y_1$–$Y_1'$ continues, but that in the direction of the axis $Y_2$–$Y_2'$ along X–X' is quenched. If the light intensity along X–X' is further increased, laser emission in the direction of the axis $Y_1-Y_1'$ is also quenched at a second threshold current $I_2$.

If the state of emission and the quenched state are respectively denoted by binaries "0" and "1," three and only three binary states can exist in the compound laser with reference to the axes $Y_1-Y_1'$ and $Y_2-Y_2'$. In response to the analogue quantity sent in the direction $X-X'$, therefore, either one of the three binary states can be taken at a time.

By fabricating a plurality of laser structures into a single block so as to produce additional axes $Y_3-Y_3'$, $Y_4-Y_4'$ ... $Y_n-Y_n'$, each intersecting the axis $X-X'$ orthogonally or at an arbitrary angle, digital light quantities of more numerous digit places can be obtained.

The function of digital-to-analogue conversion of light with this compound laser will now be described.

Let light amplification be performed in the axial direction $X-X'$ with the current density set at a value just below a threshold at which laser emission occurs in both the $Y_1-Y_1'$ and $Y_2-Y_2'$ directions. If laser light at the same wavelength as in laser operation in the directions $Y_1-Y_1'$ and $Y_2-Y_2'$ is incident from either side in the direction $Y_1-Y_1'$, laser emission occurs in the axial direction $Y_1-Y_1'$ as a result of the cooperative effect. (Background information on the cooperative effect will be found in "Cooperative Effect in GaAs Lasers" by A. B. Fowler, J. Appl. Phys., 35, p. 2275, 1964.)

Since the gain coefficient of the common active region in which the axes $X-X'$ and $Y-Y'$ intersect each other is lowered, the amplification factor of light in the axial direction $X-X'$ is decreased. Similar operation takes place when laser light is incident in the axial direction $Y_2-Y_2'$.

The difference between laser action that takes place in the $Y_1-Y_1'$ direction and that in the $Y_2-Y_2'$ direction will now be considered.

Since light amplification is taking place in the $X-X'$ direction, the gain coefficient of the common active region in which the axes $X-X'$ and $Y_1-Y_1'$ intersect each other becomes larger than that in which the axes $X-X'$ and $Y_2-Y_2'$ intersect each other. However, the photon density of laser light is invariably larger than that of amplified light, with the consequence that the gain coefficients of the two common regions aligned in the direction $X-X'$ become the same in value when laser action initiates along the $Y_1-Y_1'$ and $Y_2-Y_2'$ axes simultaneously.

The rate at which the light amplification factor is lowered in the $X-X'$ direction will be larger when laser emission occurs in the $Y_1-Y_1'$ direction alone when it occurs in the $Y_2-Y_2'$ direction alone. Therefore, if light with the necessary predetermined intensity is incident on the anti-reflection film-deposited surface from the X side, for instance, and the amplified light output is derived from the opposite side, it will be found that the output varies with the light digital quantities applied along the axis $Y_1-Y_1'$ or the axis $Y_2-Y_2'$, or both.

In a similar manner as in the A-D conversion mentioned previously, analogue quantities may be more precisely controlled by installing a plurality of similar laser structures having laser emission axes $Y_3-Y_3'$, $Y_4-Y_4'$ ... $Y_n-Y_n'$, each intersecting the $X-X'$ axis orthogonally or at a selected arbitrary angle.

Although description has been made above referring to one embodiment of a method of obtaining the active region for performing stimulated emission by utilizing current injection at a p-n junction, it will be obvious to one skilled in the art that the equivalent operation can be expected by irradiating a figure similar to the planar figure of the p-n junction with an intense light, electron beam, or ion beam.

It would not be difficult for one skilled in the art to visualize that the basic structure illustrated in the embodiment could be generalized to a geometrical configuration of semiconductor compound lasers in a single block consisting of a plurality of lasers, a plurality of light amplification structures, and a p-n junction plane, sandwiched between a p and an n type region in a kind of latticework form with common active regions at the lattice intersections.

Various semiconductors are known to perform laser action, such as for example GaAs, $GaAs_{1-x}P_x$, CdS, InP, $In_xGa_{1-x}As$, $InP_{1-x}As_x$, InAs, PbS, InSb, PbTe, and PbSe. It will be obvious that any one of these semiconductors can be used instead of GaAs in producing semiconductor compound lasers according to this invention.

Because this invention intends to provide an A–D or D–A transducer by utilizing the photon-density dependence of the gain coefficient of the semiconductor laser, transducers as extremely high speed logic elements adapted for use in optical computers can be realized, compared with the conventional electro-mechanical or electrical transducers as the conventional logic elements.

While the foregoing description sets forth the principles of the invention in connection with specific apparatus, it is to be understood that the description is made only by way of example and not as a limitation of the scope of the invention as set forth in the objects thereof.

What is claimed is:

1. A semiconductor compound laser comprising
    a crystal substrate of semiconducting material,
    a plurality of laser producing regions arrayed upon said crystal substrate, the active regions of which lie within a common plane and have parallel light emission axes,
    at least one light amplification region upon said substrate, and containing said common plane, the axis of which successively intersects the active regions of said plurality of laser producing regions at a selected angle to the parallel light emission axes thereof, and means to electrically bias said laser producing region.

2. The device of claim 1 wherein said plurality of laser producing regions and said light amplification region are all comprised of the interface between said substrate and a unitary layer of semiconductor material thereon.

3. The device of claim 2 wherein said light amplification region comprises a pair of opposing anti-reflection surfaces which comprise a portion of the boundary surfaces of said substrate and laser regions thereon, including said common plane, in a direction other than that of the parallel emission axes of said laser region.

4. The device of claim 3 wherein said anti-reflection surfaces are film-deposited surfaces and are perpendicular to said common plane.

References Cited

Kelly: IBM Technical Discl. Bull., vol. 7, April 1965, p. 1073.

Lasher: IBM Tech. Discl. Bull., vol. 7, February 1965, pp. 800, 801.

Lasher et al.: IBM J. of Research and Development, vol. 8, September 1964, pp. 471–475.

Williams et al.: IBM Tech. Discl. Bull., vol. 7, February 1965, pp. 803, 804.

ROY LAKE, Primary Examiner

SIEGFRIED H. GRIMM, Assistant Examiner

U.S. Cl. X.R.
307—312; 330—4.3